(12) United States Patent
Catania et al.

(10) Patent No.: US 6,338,386 B1
(45) Date of Patent: Jan. 15, 2002

(54) REHABILITATION OF LANDFILL GAS RECOVERY WELLS

(75) Inventors: Steven Catania, New Windsor, NY (US); Neil Mansuy, Kansas City, MO (US)

(73) Assignee: Subsurface Technologies, Rock Tavern, NY (US)

( * ) Notice: Subject to any disclaimer, the term of this patent is extended or adjusted under 35 U.S.C. 154(b) by 0 days.

(21) Appl. No.: 09/568,726

(22) Filed: May 11, 2000

(51) Int. Cl.$^7$ .......................... E21B 37/08; E21B 47/06; B09B 1/00
(52) U.S. Cl. .................. 166/290.07; 166/263; 166/311; 166/312; 405/129.5; 405/129.95
(58) Field of Search ............... 166/250.01, 250.07, 166/263, 305.1, 308, 311, 312, 369, 370, 371; 405/128.2, 129.5, 129.95

(56) References Cited

U.S. PATENT DOCUMENTS

| | | | | | |
|---|---|---|---|---|---|
| 4,026,355 A | * | 5/1977 | Johnson et al. | ..... | 405/129.95 X |
| 4,320,802 A | * | 3/1982 | Garbo | ..... | 166/267 |
| 4,518,399 A | * | 5/1985 | Croskell et al. | ..... | 405/129.95 |
| 4,890,672 A | * | 1/1990 | Hall | ..... | 166/250.01 |
| 5,111,883 A | * | 5/1992 | Savery | ..... | 166/305.1 X |
| 5,139,365 A | * | 8/1992 | Chesner | ..... | 405/129.45 |
| 5,295,763 A | * | 3/1994 | Stenborg et al. | ..... | 405/129.4 |
| 5,605,417 A | * | 2/1997 | Englert et al. | ..... | 405/129.95 X |
| 5,727,903 A | * | 3/1998 | Borray et al. | ..... | 405/129.95 X |

* cited by examiner

Primary Examiner—George Suchfield
(74) Attorney, Agent, or Firm—Eugene C. Rzucidlo; Greenberg, Traurig, LLP

(57) ABSTRACT

Gaseous and liquid carbon dioxide ($CO_2$) are applied to a landfill well to penetrate the landfill under rapid pressurization and depressurization repeated in cycles, with or without leachate or fluid in the well. These cycles can be repeated until the $CO_2$ flows more freely down a lower pressure gradient in the well into the landfill surrounding the well screen, creating fissures in the landfill which allow methane and other gases to enter the well, thereby significantly enhancing methane and other landfill gas recovery.

18 Claims, 6 Drawing Sheets

REHABILITATION OF LANDFILL GAS RECOVERY WELLS

FIELD OF THE INVENTION

The present invention relates to a method to enhance the recovery of landfill gases including methane from landfills by recovery wells.

BACKGROUND OF THE INVENTION

Landfill recovery wells are used in landfills to remove methane and other landfill gases, (methane is the predominant gas of the landfill), that are naturally produced in landfills. This removal prevents methane from building up to potentially dangerous levels. In addition to the safety concern, the methane produced can be of significant quantity for useful energy use such as generating electricity.

Methane is a by-product of specialized bacterial metabolism known as methanogenesis. Methane ($CH_4$) is a product of methanogenesis and results from degradation of organic compounds in a strictly anaerobic environment. These organic compounds can include many different items including wood, paper, carpets, sludge, or any organic waste. Methanogens are strictly anaerobic and die instantly in the slightest presence of oxygen. The methanogens that are strict aerobes can also exist in strict anaerobic microenvironments created by other aerobic microorganisms. Methanogenesis is a natural process that will take place in the presence of organic compounds and a strict anaerobic environment.

The landfill gas extraction wells can be completed in a variety of material including compacted to loose material, and can vary significantly in landfill gas recovery. The amount of landfill extracted is largely dependent upon the degree of compaction, and the nature of the material that the well is completed in. Most of these wells are constructed of PVC, High-Density polyethylene (HDPE) or similar material. The largest portion of these HDPE wells are slotted thus allowing the methane to travel through the fissures and pores and into the landfill recovery well. The largest portion of the total depth into the landfill is perforated. Most of the perforated section of these wells is unsaturated and only a small length in the bottom of the well may contain some type of leachate. As will be discussed later the unsaturated nature of these wells makes some of the traditional procedures used for well rehabilitation limited. Over time these fissures and pores become plugged with a variety of deposited material and more significantly compaction. This deposited material may consist of many different things including mineral deposits precipitated from the condensate or leachate, biological slime and byproducts of reactions between landfill materials. In addition to the deposited material the landfill continues to compact thus blocking off many of the fissures and pores that existed when the wells were initially installed. The compaction is possibly the more significant aspect in reducing methane recovery than deposition of material on the surfaces of the well screen and surrounding landfill material. Compaction is a significant problem on many landfill sites where subsidence creates sink holes, breaks in the landfill covers and shearing of the wells causing breakage.

Current well rehabilitation procedures are not well suited to work in unsaturated or semisaturated environments. Many advances have been made during the last decade in understanding well problems and well rehabilitation solutions. Traditional well rehabilitation procedures rely on a fluid in the well (most often water) to transport the energy to the zone of the well where it is required to dislodge, disrupt and remove the plugging material. This energy is often in the form of chemical or mechanical energy.

There have been recent attempts at procedures trying to overcome these limitations. In addition to not being able to transport energy into the landfill, that surrounds the landfill gas recovery wells, the current rehabilitation procedures are limited in their ability to fracture and create fissures. The traditional rehabilitation procedures used have demonstrated limited results in enhancing landfill gas recovery from these wells. It is an object of this invention to overcome these prior art problems.

SUMMARY OF THE INVENTION

The use of gaseous and liquid carbon dioxide applied during the present rehabilitation process has been demonstrated to significantly enhance landfill gas (predominately methane recovery). The energy contained in gaseous and liquid carbon dioxide has the ability to penetrate the landfill significantly further than other procedures. This energy can be carried into the landfill with or without leachate or fluid in the well. The liquid carbon dioxide can create fissures in the landfill and allow the methane to enter the well. The snow (a phase of carbon dioxide produced when the pressure of liquid carbon dioxide drops below 70 PSI) produced can also create fractures and release energy over a longer period of time. In addition to the energy being delivered into the landfill without saturation, it is also possible to add fluid into the well during the injection process in order to achieve more penetration.

Another aspect of the present procedure utilizes rapid pressurization and depressurization repeated in cycles. This cyclic event can be repeated until flow of liquid and gaseous carbon dioxide flows more freely (a lower pressure in the well) into the landfill surrounding the well screen. Each time the flow is increased into the landfill the fractures and fissures can be created further away from the well. With an increasing network of fissures surrounding the well, landfill gases including methane can more easily be transported towards and into the well.

Carbon dioxide, in addition to having tremendous energy also reduces surface tension allowing it to penetrate into the surrounding landfill. The energy contained in gaseous, liquid or solid carbon dioxide can also effectively remove any of the biological or mineral deposits that may also impede the transportation of methane through the fissures and openings in the fill or well screen.

DETAILED DESCRIPTION OF THE INVENTION

Figure 1:
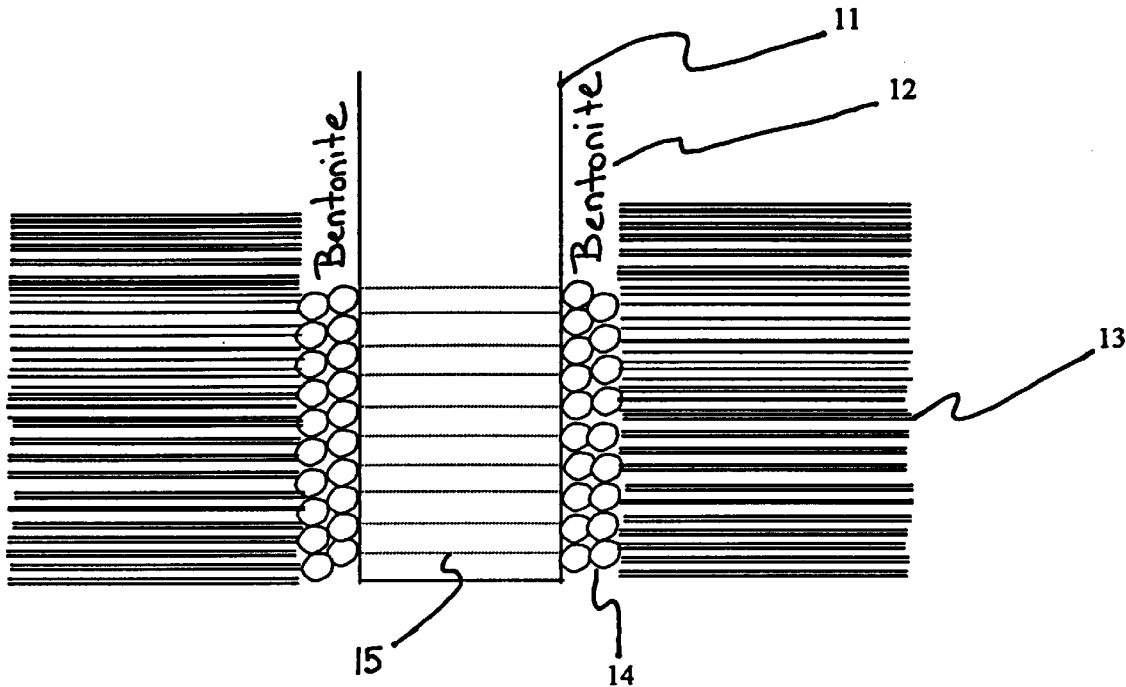
FIG. 1 shows a landfill well in a compacted landfill.

The extraction of landfill gases can become reduced or negated because of various factors occurring within the landfill and the interaction of the landfill and the extraction well. FIGS. 1, 2, 3 and 4 show landfill extraction wells within a landfill in which the extraction of landfill gases may have become reduced. In FIG. 1 there is shown an extraction well having a well casing 11 and a bentonite sealing material 12. Inside the well and along the well casing 11 is a porous filtering material (filter pack) 14 which allows landfill gas to flow through the well casing 11 but restricts or prevents the landfill material from entering the extraction well. A well screen 15 is shown as a series of lines within the well casing 11. FIG. 1 shows a landfill well having a compacted landfill formation.

Figure 2:
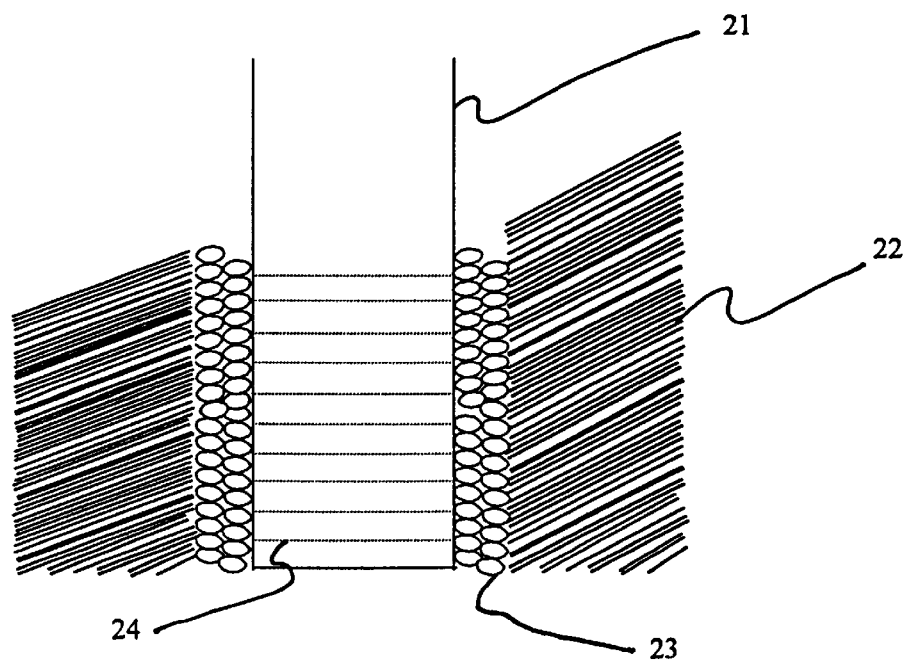
FIG. 2 shows a landfill well in a shifted landfill formation

FIG. 2 shows a landfill well in which the landfill material 22 is shifted within the formation. The landfill well comprises a well casing 22 well screen 24 and a filter pack 23.

Figure 3:
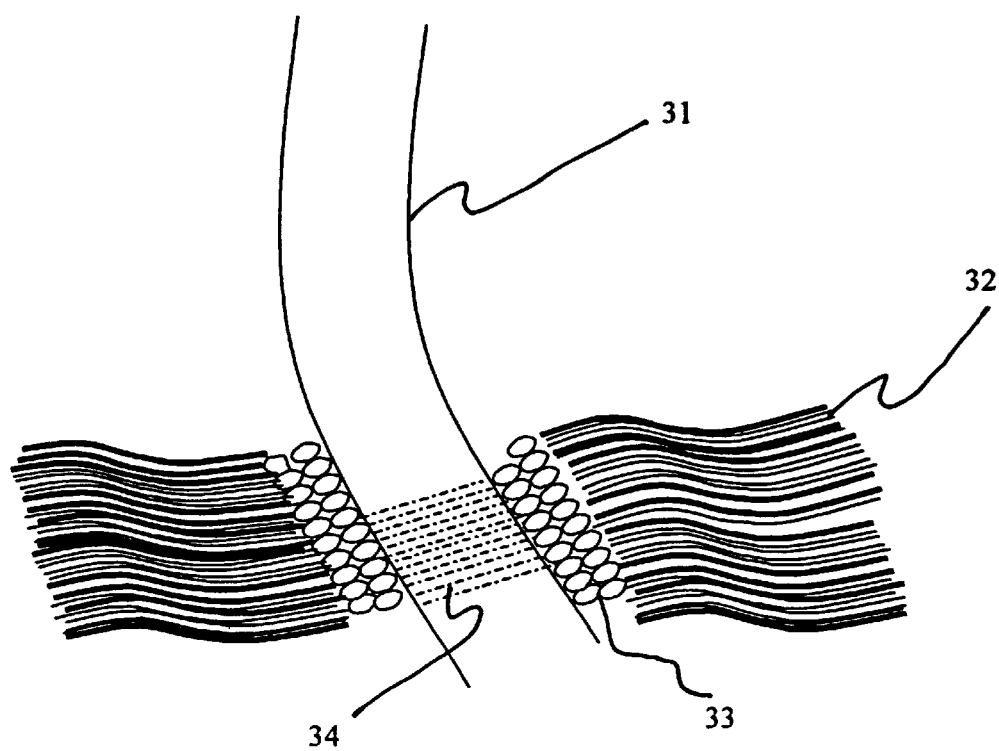
FIG. 3 shows a shifted landfill well in a shifted landfill formation

FIG. 3 is a representation of a shifted landfill well with shifted landfill material 32 within the formation. The landfill well comprises shifted well casing 31 as well as shifted well screen 34 and filter pack 33

Figure 4:
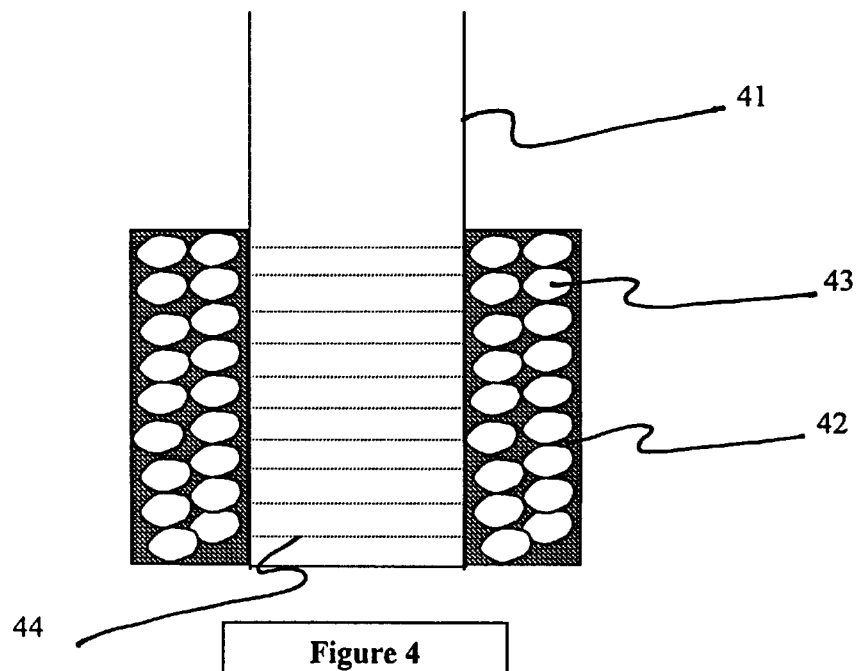
FIG. 4 shows a landfill well with bridging and fouling

FIG. 4 shows a landfill well with bridging and fouling. The bridging and fouling material 42 clogs the filter pack 43 and lessens or prevents access by the landfill gas through well casing 41 and well screen 44.

Figure 5:
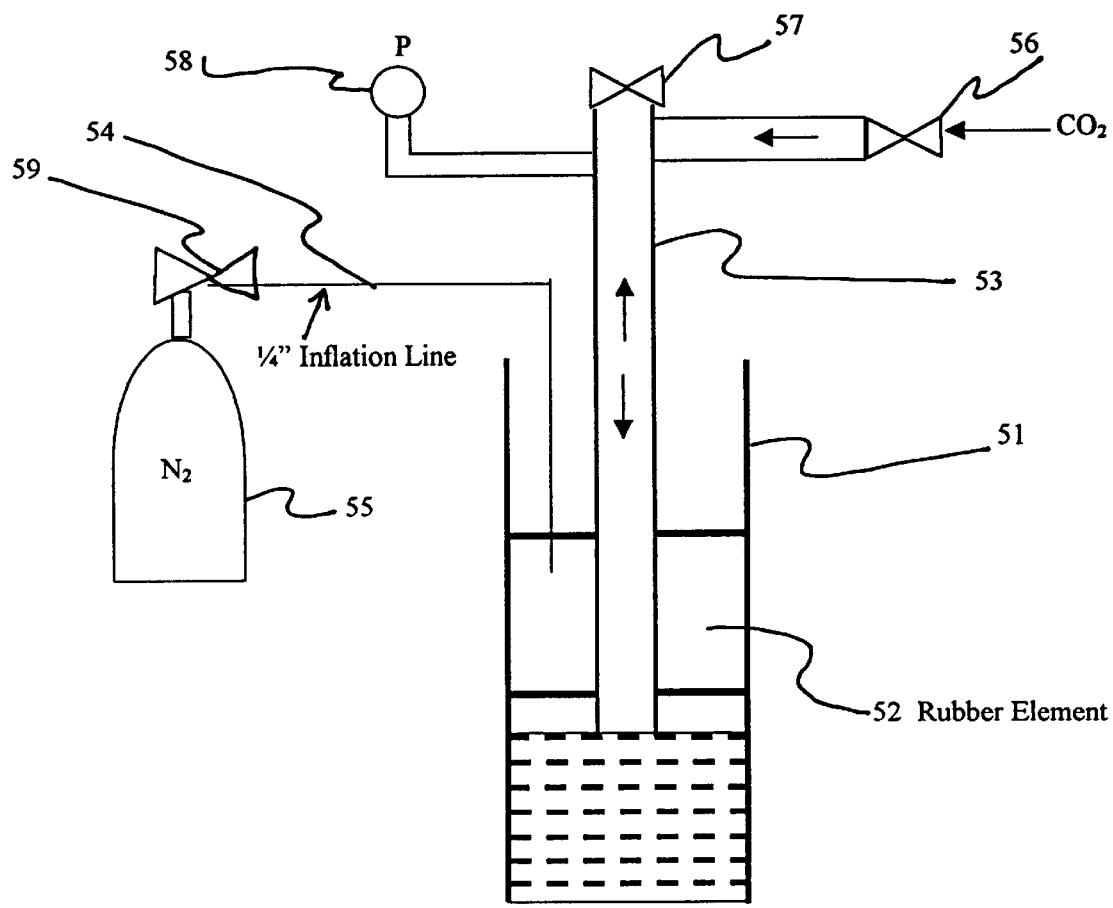
FIG. 5 shows a landfill well with valving assembly and inflation tank
Figure 6:
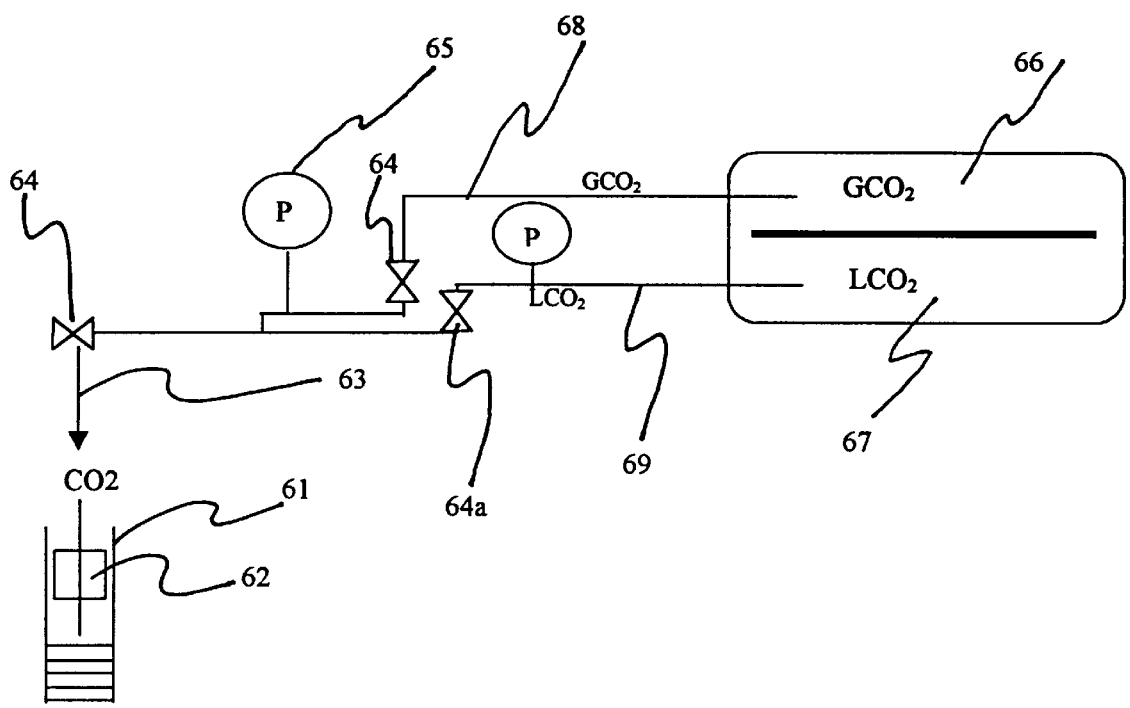
FIG. 6 shows a landfill well and a carbon dioxide tank

FIGS. 5 and 6 show an apparatus, which is employed in the method of the present invention. A well packer 52, 62 is placed within the well casing 51, 61 and the extraction well is sealed by inflation of the packer 52,62. The inflation line 54 carries an inflation gas such as nitrogen from the tank 55 wherein the gas flow is controlled by valve 59. The carbon dioxide used in the method is injected through line 53, 63 which extends between the $CO_2$ gas inlet 56, 64 and through well packer 52, 62. The $CO_2$ can be contained in a tank containing liquid $CO_2$ 67 and gaseous $CO_2$ 66 and the $CO_2$ is injected into the well via lines 63, 68, 69. Valves 64, 64a control the flow and the pressure can be measured by a pressure gauge 65. The pressure within the well can be measured via pressure gauge 58 and flow through the system can be controlled by valves 56, 57

Figure 7:
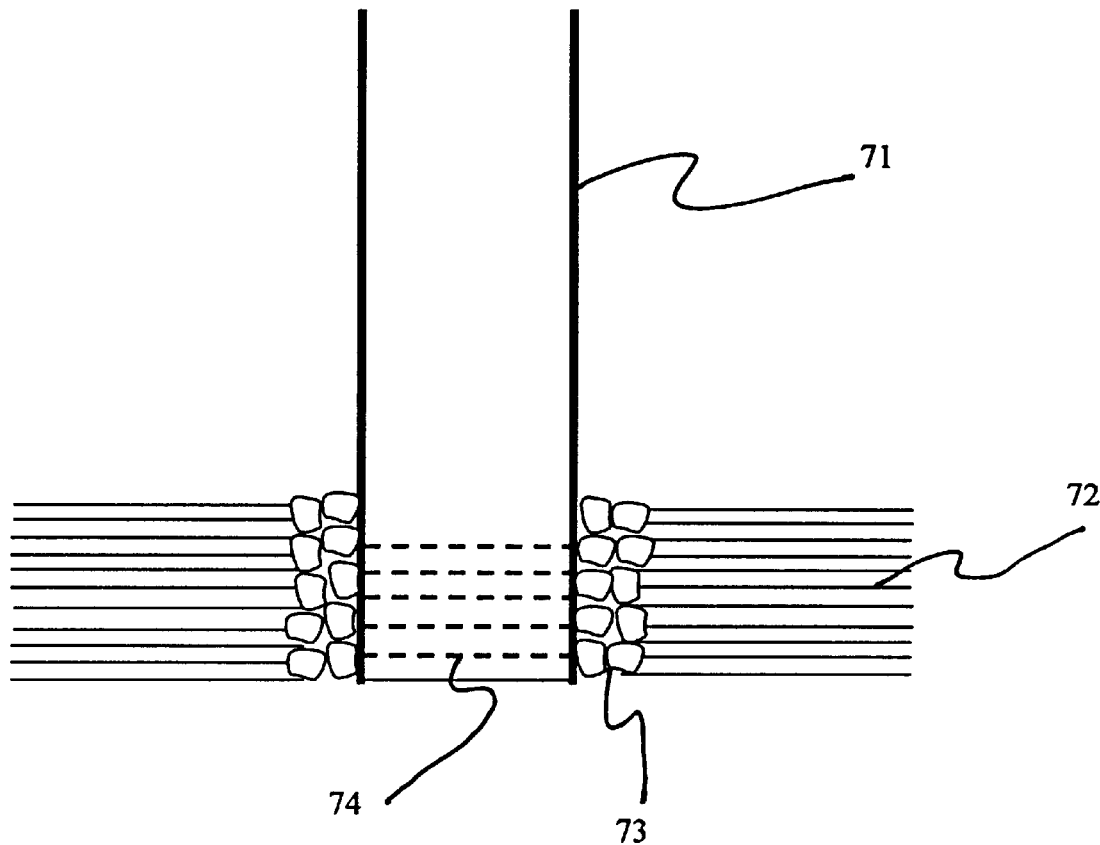
FIGS. 7, 8 and 9 show various types of landfill wells after rehabilitation.
Figure 8:
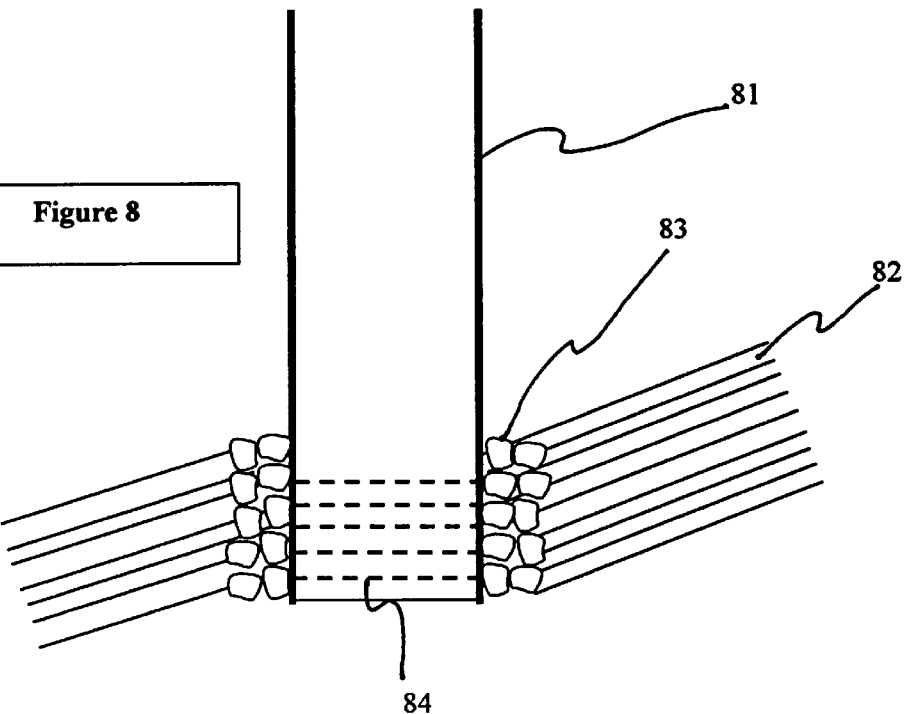

FIGS. 7 and 8 show landfill wells after rehabilitation by the present method. It can be seen that the landfill material 72, 82 around well casing 71, 81 and filter pack 73,83 and well screen 74, 84 has become less compacted.

Figure 9:
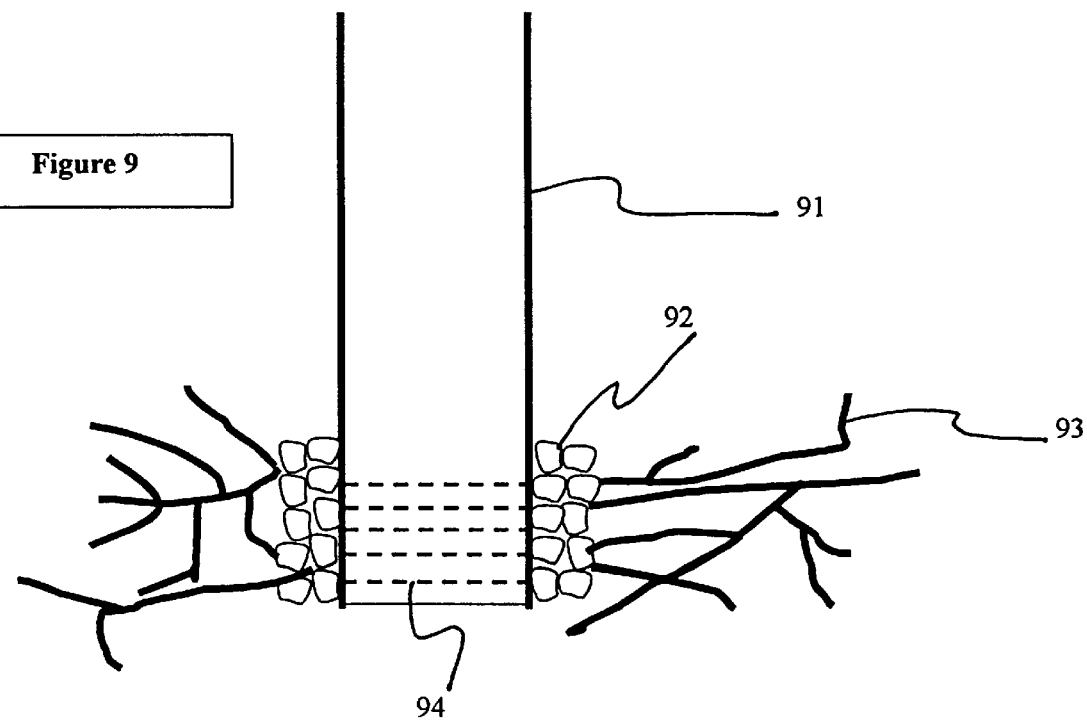

FIG. 9 shows a landfill well wherein fracturing of the formation post treatment has occurred. Fractures 93 can be seen in the landfill formation around the well casing 91, filter pack 92 and well screen 94.

Typically, landfill gas extraction wells are constructed at various locations throughout landfills. The extraction wells act as a relief or vent conduit to relieve the unwanted build up of landfill gas that is accumulating in the underlying layers (below the cap) of the landfill. Accumulated landfill gas creates a fire hazard if not removed. Usually the gas is removed through a vacuum system that is connected to the top of the well head of each gas extraction well. The development and enhancement of landfill gas wells is completed by creating and opening passages through the dense, highly compacted, landfill formation which is comprised of compacted trash. The openings will allow for the flow of gas from the landfill gas wells. Additionally the invention relates to removing and dislodging mineral scaling and bio fouling present in the landfill formation.

In the method of the instant invention, a landfill gas well is sealed with an inflatable packer. The packer can be comprised of an elastic expandable material such as a rubber element that may be inflated with a gas such as, for example, nitrogen. The inflation line will consist of tubing of convenient dimension that penetrates the top of the inflation element or well packer. The inflation line will be connected to a high-pressure cylinder at the surface. The inflation element is wrapped around a mandrel pipe to allow for the passage of fluids and gas. The well packer is lowered to the top of the well screen by using a high-pressure hose that is connected to the top of the packer. The top of the hose is fitted with a valving assembly to control and monitor the pressurization of the landfill gas well.

Under certain applications, water may be injected into the well through the packer to fill the screened interval. The level of water in the well may then be monitored using a water level indicator tool. The landfill formation may absorb the water. If this occurs the well may be filled again with water. The water is used as a transport mechanism to carry energy into the landfill formation.

Carbon Dioxide is injected into the well through the hose and packer assembly. $CO_2$ gas is injected at relatively low pressure, ranging from 1psi to 600 psi. By injecting $CO_2$ gas into the sealed well that -may be filled with water carbonic acid will be produced, as a result of this byproduct, mineral scaling will be scoured.

The formation is rehabilitated by pressurization with $CO_2$. Normally, the pressurization is conducted using a pressurization schedule. Once the predetermined pressure is achieved the $CO_2$ source is tuned off. A period of time is waited and the pressure is monitored. This process is repeated in cycles. Typically 1 to 50 cycles are repeated. At each cycle more pressure is generated, until the well no longer holds pressure. This is an indication that the well screen is now open.

The well head valve is opened to release any residual $CO_2$ and pressure. The well may be again filled with water. The landfill gas well is now quickly pressurized and depressurized to produce a surging and flushing system to get the fluids moving freely through the well screen.

A combination of liquefied and non-liquefied carbon dioxide is introduced into the well. The gas mixture assists the flow of liquid $CO_2$ into the well. $CO_2$ will be injected into the well with increased and decreased injection pressures to pulse or spike $CO_2$ pressure in the landfill formation The liquid $CO_2$ will expand at its natural expansion rate as it enters the well screen; this expansion will dislodge bridging and fouling mechanisms around the outside of the well screen. This rapid expansion will physically lift and create openings and passages for landfill gas to flow through. The process of injecting a $CO_2$ mixture will be a continuous injection until the predetermined volume, as calculated by formula, is exhausted. This process of injecting a $CO_2$ mixture will physically dislodge masses and mineral encrustation that are present in the landfill formation.

The present method of enhancing and developing flow of landfill gas into an extraction well from a compacted landfill formation comprises the steps of lowering a packer into the well and inflating the packer creating a pressure seal thereto. Liquefied and non liquefied carbon dioxide is introduced into the extraction well through the cap to clean the mineral encrustation in the well and to pressurize the well and to clean and create passages to said well. By pressurizing the well and quickly depressurizing the well a surge, flush and backwash of the well is obtained. Pressurization of the well can also be attained with liquefied and non liquefied carbon dioxide gas to physically expand at $CO_2$ expansion rates in the well and the landfill formation. This process of expansion creates new passages in said landfill formation, lifts the landfill formation to enlarge existing passageways into said well and allows for the flow of landfill gas. It also breaks up and dislodges bridging, slime forming masses and fouling mechanisms in said landfill formation.

The instant method introduces liquid or gaseous $CO_2$ into the landfill gas well. Non liquefied carbon dioxide gas can be mixed with water to produce carbonic acid in the landfill gas well.

Non liquefied carbon dioxide gas is introduced to generate pressure in the landfill well to open the blocked well screen.

The steps of pressurizing the well are repeated achieving higher pressures with each injection.

Non liquefied carbon dioxide gas is quickly pressurized and depressurized to backwash and flush the well screen.

The steps of pressurization and depressurization are repeated, each time a longer duration of injecting is achieved to maintain landfill formation penetration.

A mixture of liquefied and non liquefied $CO_2$ is injected into the well in a manner to produce spike or pulsing effect and the mixture of liquefied and non liquefied carbon dioxide expands in the landfill formation to create passageways for flow of landfill gases and fluids.

The steps of introducing a mixture of liquefied and non-liquefied carbon dioxide expands in the landfill formation to achieve the dislodgment of bacterial growths and associated byproducts.

The expansion rate of carbon dioxide creates fractures in compacted landfill formations that allows the flow of gas and fluids.

What is claimed is:

1. A method of enhancing recovery of landfill gases from a landfill comprising:
   sealing a landfill gas well;
   introducing carbon dioxide ($CO_2$) into the sealed landfill gas well; and
   pressurizing and depressurizing the sealed landfill gas well, thereby enhancing the flow of the landfill gas well and thereby enhancing the flow of landfill gas from the landfill.

2. The method of claim 1, wherein $CO_2$ is introduced at relatively low pressure.

3. The method of claim 1, further comprising injecting water into the landfill gas well.

4. The method of claim 1, wherein the pressurization and depressurization is repeated in cycles so as to open the formation and reduce downhole pressure.

5. The method of claim 4 wherein the cycling is repeated until a surge, flush and backwash of the landfill well is obtained.

6. The method of claim 1, wherein the introduction pressure of the $CO_2$ is increased and decreased during injection to pulse or spike $CO_2$ pressure in the landfill formation.

7. The method of claim 1, wherein $CO_2$ pressurization is conducted using an increased injection duration with each subsequent cycle.

8. The method of claim 7 wherein $CO_2$ introduction into the landfill well is carried out until a predetermined $CO_2$ volume is reached.

9. The method of claim 1, further comprising monitoring $CO_2$ pressure in the landfill well and repeating the $CO_2$ pressurization cycling.

10. The method of claim 4 wherein the cycle repeating is carried out to a landfill gas well pressure at which the landfill gas well no longer holds pressure.

11. The method of claim 10, further comprising releasing residual $CO_2$ and pressure.

12. The method of claim 1, wherein a mixture of liquefied and non-liquefied $CO_2$ is introduced into the landfill gas well.

13. The method of claim 12 wherein expansion of liquid $CO_2$ in the landfill gas well as it enters a well screen of the landfill gas well dislodges bridging and fouling material in and around the well screen.

14. The method of claim 12, wherein a predetermined volume of the $CO_2$ mixture is introduced.

15. The method of claim 12, wherein the introduced $CO_2$ mixture cleans mineral encrustation in the landfill gas well, pressurizes the landfill gas well and cleans and creates passages in the landfill gas well.

16. The method of claim 7, wherein $CO_2$ cycling achieves a higher pressure with each $CO_2$ injection.

17. The method of claim 1, wherein non-liquefied $CO_2$ gas is pressurized and depressurized to backwash and flush a sell screen of the landfill gas well.

18. The method of claim 1, further comprising dislodgment of bacterial growths and associated by-products from the landfill gas well.

* * * * *